April 23, 1940.　　　A. PECKHAM　　　2,198,089
ADJUSTABLE BRACKET
Filed June 29, 1939
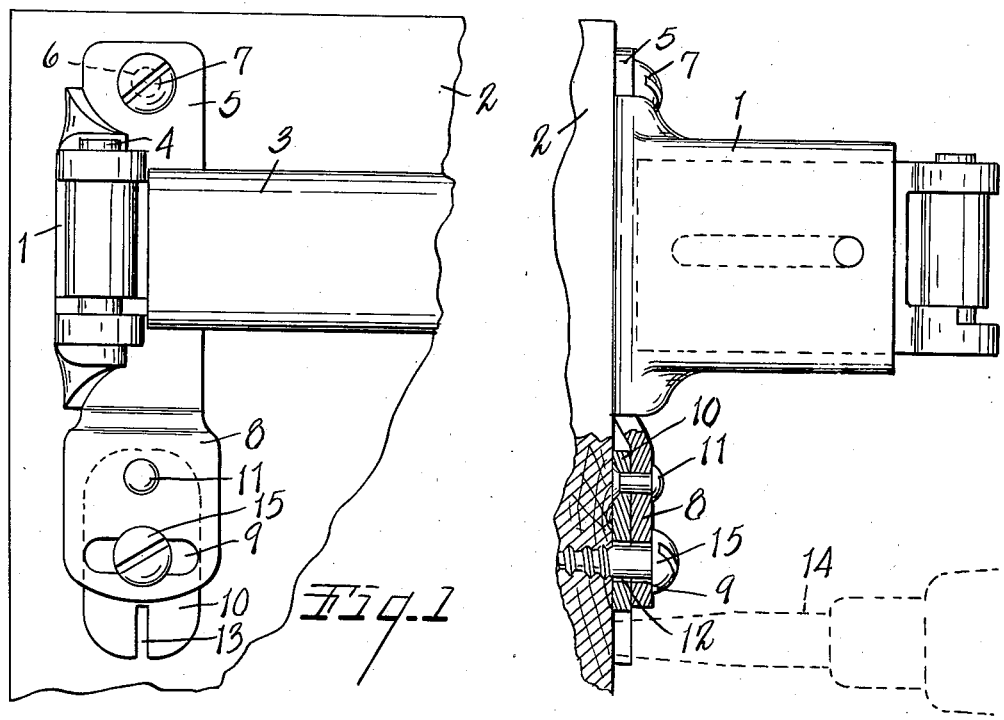
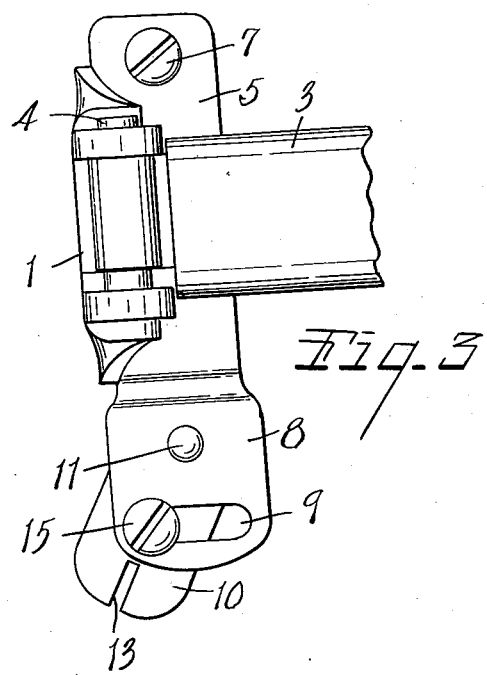
INVENTOR.
Alfred Peckham
BY Earl & Chappell
ATTORNEYS.

Patented Apr. 23, 1940

2,198,089

UNITED STATES PATENT OFFICE 2,198,089

ADJUSTABLE BRACKET

Alfred Peckham, Sturgis, Mich., assignor to Kirsch Company, Sturgis, Mich.

Application June 29, 1939, Serial No. 281,934

10 Claims. (Cl. 156—19)

This invention relates to improvements in adjustable brackets.

This invention relates to brackets for swinging curtain rods or the like and relates particularly to means for adjusting brackets for swinging curtain rods or for curtain rods which are supported at one end and which may be caused to sag by the weight of the curtain thereon and which have heretofore caused considerable difficulty in installation because of the difficulties of leveling the rods.

It has for its objects:

First, to provide a new improved bracket and adjustment therefor.

Second, to provide such a bracket in which adjustment may be accomplished by a simple screw driver and in which the one installing and adjusting the bracket may position himself out away from the window so as to check the adjustment.

Third, to provide such a bracket which may be made simply and inexpensively.

Further objects and advantages pertaining to details and economies of construction and operation will appear from the description to follow. A preferred embodiment of my invention is illustrated in the accompanying drawing, in which:

Fig. 1 is a front view of my improved bracket.

Fig. 2 is a view taken from the left of Fig. 1 and partly in section.

Fig. 3 is a view corresponding to Fig. 1, showing the bracket of Fig. 1 moved to a slightly different adjusted position.

My improved bracket 1 is shown in Figs. 1 and 2 as attached to a wall or window casing 2. A rod 3 is connected with a pivotal connection 4 to the bracket. The bracket is of sheet metal and has a sheet metal base 5 which is provided with an upper hole 6 and an attaching screw 7 or the like pivotally disposed in said hole. The bottom portion 8 of the bracket is offset slightly from the rest of the base away from the wall or support. It is provided with a vertically extending slot 9. Beneath the base 5 of the bracket and at the lower end is an adjusting member 10 which is pivotally attached by rivet 11 to the bracket at a point above the slot 9. The adjusting member 10 extends below the bottom of the bracket. The adjusting member 10 is provided with a hole 12 in register with the slot 9 and at its bottom is provided with a slot 13 to receive a common screw driver which is shown in dotted lines at 14 in Fig. 2. The slot 13 is so disposed that the adjusting member 10 may be swung about the hole 12 by turning the screw driver fitted in the slot 13, as shown in Fig. 2. An attaching screw 15 extends through the hole 12 and the slot 9.

When my bracket is employed, it is attached to the wall or window casing by means of the screw 7 extending through the hole 6. The bracket is then roughly leveled and the screw 15 is inserted into the wall or window casing through the slot 11 and the hole 12 with the adjusting member 10 in the position shown in Fig. 1. The screw is tightened sufficiently to hold the bracket in adjusted position momentarily during adjustment of the bracket and the final leveling of the bracket then takes place. It may be possible that the screw 7 may be tightened sufficiently to frictionally hold the bracket momentarily in adjusted position. The adjustment of the bracket is obtained by inserting the screw driver 14 in the slot 13 and by turning the screw driver it is possible to raise or lower the rod 3. Twisting the screw driver in a clockwise direction adjusts to the position shown in Fig. 3, whereas a counterclockwise turning of the screw driver will adjust to the opposite position. The curtain or drape may be in place on the rod during adjustment and the one installing and adjusting may position himself out in front of the window so as to check the adjustment and assure leveling of the rod.

When the proper adjustment is made, the screw 15 is tightened to clamp the lower end of the bracket in place and the screw 7 may also be tightened if desired.

It will be apparent that I have provided a simple and inexpensive adjustable bracket which may be made of metal stampings or the like and that this bracket may be easily and simply adjusted and the adjustment may be made in such a manner as to assure easy leveling of the curtain rod.

It will be apparent that modifications of the structure shown and described can be made without departing from my invention and it is my desire to cover such modifications as well as the specific form of bracket shown. I have defined the invention in the claims.

Having thus described my invention, what I claim as new and desire to secure by Letters Patent is:

1. A bracket for swinging curtain rods or the like, comprising a wall engaging base, a hole at the top of the base to receive an attaching screw or the like, the bottom of the base being offset to lie away from the wall, an adjusting lever pivotally attached to the rear of said bottom offset portion of the base and extending therebelow, a horizontal slot in the bottom offset portion of said base below the point of attachment of said adjusting lever to receive an attaching screw or the like and to permit swinging of said bracket about said hole at the top as an axis, a hole in said adjusting lever to receive an attaching screw or the like and in register with the slot of said bracket, and a slot in said adjusting member extending below said bracket to receive a screw driver to rotate said adjusting lever about the hole therein as an axis to level the bracket.

2. A bracket for swinging curtain rods or the like, comprising a wall engaging base, a hole at the top of the base to receive an attaching screw or the like, an adjusting lever pivotally attached to said base, a horizontal slot in said base below the point of attachment of said adjusting lever to receive an attaching screw or the like and to permit swinging of said bracket about said hole at the top as an axis, a hole in said adjusting lever to receive an attaching screw or the like and in register with the slot of said bracket, and a slot in said adjusting member extending below said bracket to receive a screw driver to rotate said adjusting lever about the hole therein as an axis to level the bracket.

3. A bracket for swinging curtain rods or the like, comprising a wall engaging base, a hole at the top of the base to receive an attaching screw or the like, the bottom of the base being offset to lie away from the wall, an adjusting lever pivotally attached to the rear of said bottom offset portion of the base and extending therebelow, a horizontal slot in the bottom offset portion of said base below the point of attachment of said adjusting lever to receive an attaching screw or the like and to permit swinging of said bracket about said hole at the top as an axis, a hole in said adjusting lever to receive an attaching screw or the like and in register with the slot of said bracket, and means on said adjusting lever engageable from in front to rotate said adjusting lever about the hole therein as an axis to level the bracket.

4. A bracket for swinging curtain rods or the lke, comprising a wall engaging base, a hole at the top of the base to receive an attaching screw or the like, an adjusting lever pivotally attached to said base, a horizontal slot in said base below the point of attachment of said adjusting lever to receive an attaching screw or the like and to permit swinging of said bracket about said hole at the top as an axis, a hole in said adjusting lever to receive an attaching screw or the like and in register with the slot of said bracket, and means on said adjusting lever engageable from in front to rotate said adjusting lever about the hole therein as an axis to level the bracket.

5. A bracket for swinging curtain rods or the like, comprising a wall engaging base having an offset portion adapted to lie away from the wall, an adjusting lever, pivotal means attaching said adjusting lever to the rear of said offset portion of the base, said lever having a portion extending beyond said base, a hole in said base spaced from said pivotal means, and a slot spaced from and on the other side of said pivotal means and extending transversely of the line on which said hole and said pivotal means lie, a hole in said lever in register with said slot, and a slot in the extending portion of said lever to receive a screw driver to rotate said lever about the hole therein as an axis.

6. A bracket for swinging curtain rods or the like, comprising a wall engaging base having an offset portion adapted to lie away from the wall, an adjusting lever, pivotal means attaching said adjusting lever to the rear of said offset portion of the base, said lever having a portion extending beyond said base, a hole in said base spaced from said pivotal means, and a slot spaced from and on the other side of said pivotal means and extending transversely of the line on which said hole and said pivotal means lie, a hole in said lever in register with said slot, and means on said lever engageable from in front to rotate said lever about the hole therein as an axis.

7. A bracket for swinging curtain rods or the like, comprising a wall engaging base, an adjusting lever, pivotal means attaching said adjusting lever to a hole in said base spaced from said pivotal means, and a slot spaced from and on the other side of said pivotal means and extending transversely of the line on which said hole and said pivotal means lie, a hole in said lever in register with said slot, and a slot in said lever to receive a screw driver to rotate said lever about the hole therein as an axis.

8. A bracket for swinging curtain rods or the like, comprising a wall engaging base, an adjusting lever, pivotal means attaching said adjusting lever to a hole in said base spaced from said pivotal means, and a slot spaced from and on the other side of said pivotal means and extending transversely of the line on which said hole and said pivotal means lie, a hole in said lever in register with said slot, and means on said lever engageable from in front to rotate said lever about the hole therein as an axis.

9. A bracket for swinging curtain rods or the like having a base, comprising a pair of pivotally connected members each having a hole for an attaching screw or the like, whereby said members may be mounted on a wall with the holes for the attaching screws and the pivotal connection of the members in substantial alinement, and means on one of the members engageable from the face of the bracket for pivoting said members about the holes therein as axes comprising a slot to receive a screw driver.

10. A bracket for swinging curtain rods or the like having a base comprising a pair of pivotally connected members each having a hole for an attaching screw or the like, whereby said members may be mounted on a wall with the holes for the attaching screws and the pivotal connection of the members in substantial alinement, and means on one of the members engageable from the face of the bracket for pivoting said members about the holes therein as axes.

ALFRED PECKHAM.